Sept. 20, 1949.   G. R. PURIFOY ET AL   2,482,506
TRAIN-LINE CONTROL SYSTEM
Filed June 15, 1946
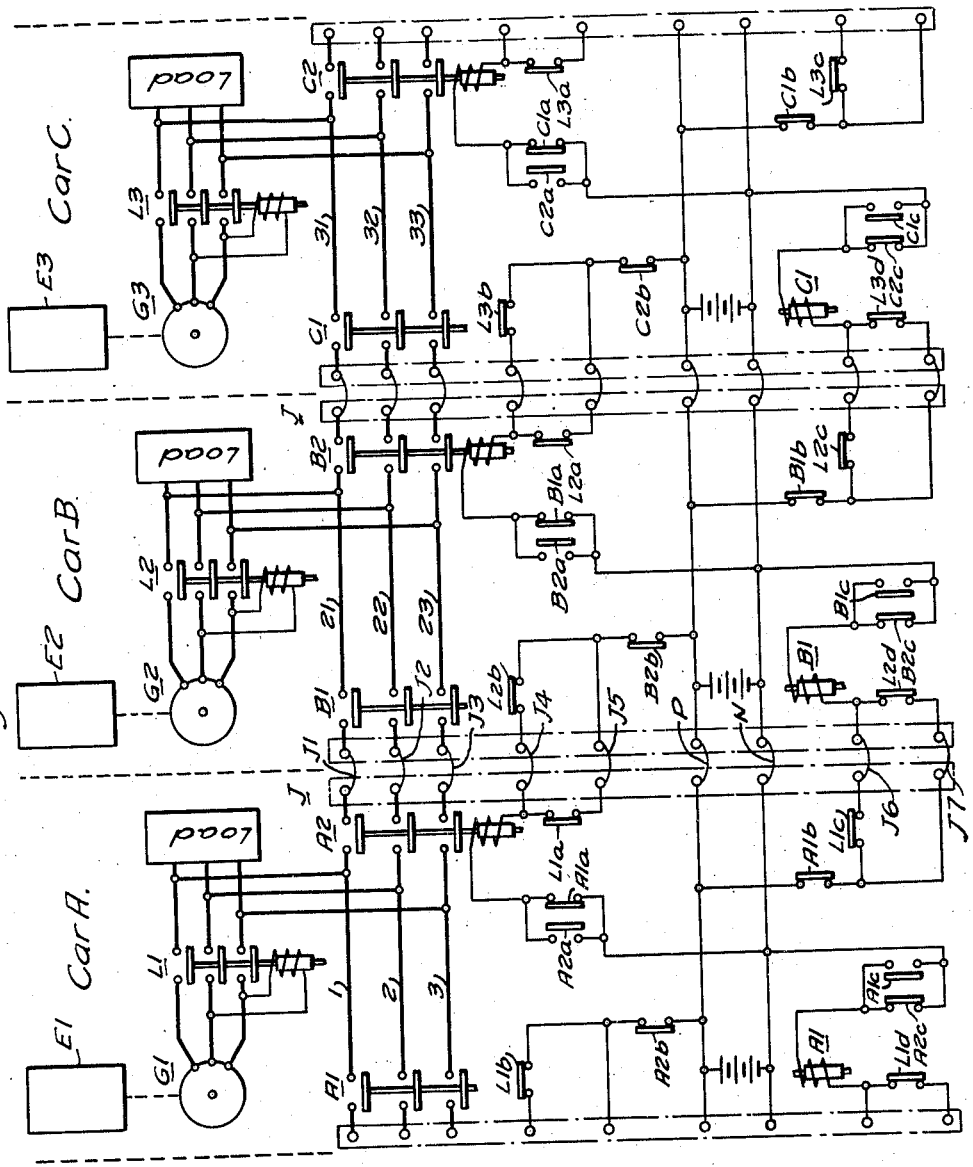
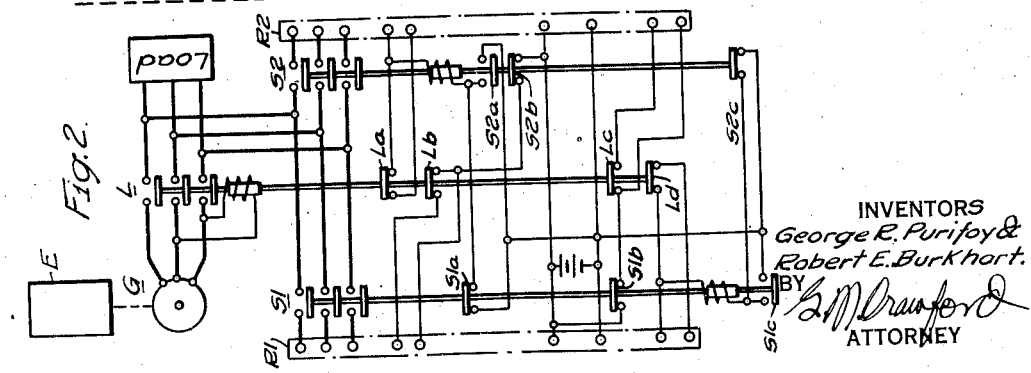
INVENTORS
*George R. Purifoy &*
*Robert E. Burkhart.*
BY
ATTORNEY Patented Sept. 20, 1949

2,482,506

UNITED STATES PATENT OFFICE 2,482,506

TRAIN-LINE CONTROL SYSTEM

George R. Purifoy and Robert E. Burkhart, Pittsburgh, Pa., assignors to Westinghouse Electric Corporation, East Pittsburgh, Pa., a corporation of Pennsylvania Application June 15, 1946, Serial No. 676,906

7 Claims. (Cl. 171—97)

Our invention relates, generally, to control systems, and, more particularly, to train-line control systems.

Modern railway passenger cars are equipped with air conditioning units and other electrical apparatus which require a relatively large amount of power. Furthermore, it is essential that power be available at all times while a car is in service. One way of supplying this power is to provide an engine-driven generator for each car.

An object of our invention is to provide for maintaining power on a car in the event of failure of either the generator or the engine on that car.

Another object of our invention is to automatically connect the apparatus on one car to the generator on an adjacent car in case of a power failure on the first car.

A further object of our invention is to prevent any one generator from supplying power to more than two cars at a time.

A more general object of our invention is to provide a train-line control system which shall be simple and efficient in operation and which may be economically manufactured and installed.

Other objects of our invention will be explained fully hereinafter or will be apparent to those skilled in the art.

In accordance with one embodiment of our invention, the load circuit for a car of a train is automatically disconnected from the generator on that car in case of failure and connected through train-line wires to the generator on an adjacent car. A generator cannot be connected to more than two cars at a time.

For a better understanding of the nature and objects of our invention reference may be had to the following detailed description, taken in conjunction with the accompanying drawing, in which:

Figure 1 is a diagrammatic view of a multi-car train-line control system embodying the principal features of our invention, and Fig. 2 is a detail diagrammatic view of the apparatus and circuits required for one car of a multi-car train.

Referring now to the drawing, particularly to Fig. 1, a train-line control system is shown for three cars, A, B and C, of a multi-car train. It will be understood that as many cars as desired may be utilized, the equipment for each car being the same as that illustrated.

As shown in Fig. 2, three phase power is normally supplied to each car by a generator G which is driven by an engine E. The generator G is connected through a main switch L to the load circuit and to one side of train-line switches S1 and S2. In Fig. 1, the train-line switches are designated A1 and A2 for car A, B1 and B2 for car B and C1 and C2 for car C. The train-line power conductors are designated 1, 2 and 3 for car A, 21, 22 and 23 for car B and 31, 32 and 33 for car C. The engine and the generator for car A are designated E1 and G1, respectively, E2 and G2 for car B, and E3 and G3 for car C.

The other side of each train-line switch is connected to a receptacle located at the end of the car. The receptacle at one end of each car is designated R1 and at the other end it is designated R2. These receptacles also contain contact members for the control circuits for controlling the operation of the train-line switches. The train-line receptacles may be connected on all cars of a train by jumpers J while in service.

The receptacles and jumpers are so constructed that they can be connected in only one position. However, they are symmetrical so that it does not matter which end receptacle is utilized or which end of a car is adjacent to the next car. The control power may be supplied by a battery on each car. The jumpers J contain wires P and N for the battery connections. If all of the jumpers are connected, the system will function automatically, as described hereinafter, in case of engine or generator failure. The connections may be made manually between the cars desired at the time of a failure.

Assume that all of the train-line receptacles are connected and that the power supply on car B becomes dead while this car is connected between two live cars A and C. At the instant that the engine generator set on car B becomes dead the actuating coil of the switch L2 which is connected across one phase of the generator G2 is deenergized, thereby opening the main contact members of the switch L2 and closing its interlocking contact members. When these interlocks are closed circuits are established to energize the actuating coils of the train-line switches B1 and B2. These two switches are so electrically interlocked that the one which closes first will open the circuit to the coil of the other switch, thereby preventing it from closing and also determining from which live car the dead car will receive power.

Assuming that the switch B1 closes first, the energizing circuit for its coil is obtained in the following manner. Starting from the negative terminal of the battery on car B, the circuit extends through an "out" interlock B2c on the switch B2, the coil of the switch BI, an "out" interlock L2d on the switch L2, a jumper wire J7 and an "out" interlock A1b on the switch A1 to the positive terminal of the battery. The coil of the switch A2 is energized through a circuit which extends from positive through "out" interlocks B2b and L2b, a jumper wire J4, the coil of the switch A2 and an "out" interlock A1a to negative. The generator G1 on car A is now supplying power for both cars A and B.

If car C should now become dead, in addition to car B which is already dead, it would be impossible to supply power to this car from the generator on car A. The coil of the switch B2 cannot be energized because an "out" interlock B1a on the switch B1 is open. Likewise, the coil of the switch C1 cannot be energized because an "out" interlock B1b is also open. If this condition should occur, car C would be supplied with power from the next connected car.

If the train-line jumpers had not been connected, it would be necessary to make connections between the cars affected. These connections can be made at the most convenient end of the dead car which is adjacent to a live car.

From the foregoing description, it is apparent that we have provided a train-line control system which is entirely automatic when the jumpers between cars are in place. If desired, the system may be operated manually by plugging in the jumpers between a dead car and a live car. A small amount of equipment is required and a low voltage source of control power is utilized. The danger from handling a high voltage jumper while connecting cars is eliminated because the switches which establish the high voltage connections to the receptacles cannot be closed until after the jumpers are installed to complete the low voltage control circuits.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a train-line control system for a plurality of cars, in combination, a generator on each car, means for driving the generators, a plurality of train-line power conductors on each car, switching means for connecting the generator on each car to the power conductors on that car, means responsive to the generator voltage for controlling the operation of said switching means, first and second additional switching means on each car for connecting the train-line power conductors on a car to the conductors on one or the other of the adjacent cars, interlocking means on said first-named switching means for controlling the operation of said first and second additional switching means, and cross-connected interlocking means on said first and second additional switching means cooperating with said first-named interlocking means in the control of said first and second additional switching means.

2. In a train-line control system for a plurality of cars, in combination, a generator on each car, means for driving the generators, a plurality of train-line power conductors on each car, switching means for connecting the generator on each car to the power conductors on that car, means responsive to the generator voltage for controlling the operation of said switching means, first and second additional switching means on each car for connecting the train-line power conductors on a car to the conductors on one or the other of the adjacent cars, interlocking means on said first-named switching means for controlling the operation of said first and second additional switching means, and cross-connected interlocking means on said first and second additional switching means cooperating with said first-named interlocking means in the control of said first and second additional switching means, said cross-connected interlocking means functioning to prevent one generator from supplying power to more than two cars at a time.

3. In a train-line control system for a plurality of cars, in combination, a generator on each car, means for driving the generators, a plurality of train-line power conductors on each car, switching means for connecting the generator on each car to the power conductors on that car, a switch at each end of each car for connecting the train-line power conductors on a car to the conductors on one or the other of the adjacent cars, and interlocking means actuated by said switching means for controlling the operation of said switches.

4. In a train-line control system for a plurality of cars, in combination, a generator on each car, means for driving the generators, a plurality of train-line power conductors on each car, switching means for connecting the generator on each car to the power conductors on that car, means responsive to the generator voltage for controlling the operation of said switching means, a switch at each end of each car for connecting the train-line power conductors on a car to the conductors on one or the other of the adjacent cars, and interlocking means on said switching means for controlling the operation of said switches.

5. In a train-line control system for a plurality of cars, in combination, a generator on each car, means for driving the generators, a plurality of train-line power conductors on each car, switching means for connecting the generator on each car to the power conductors on that car, means responsive to the generator voltage for controlling the operation of said switching means, a switch at each end of each car for connecting the train-line power conductors on a car to the conductors on one or the other of the adjacent cars, interlocking means on said switching means for controlling the operation of said switches, and additional interlocking means on said switches cooperating with said first-named interlocking means in the control of said switches.

6. In a train-line control system for a plurality of cars, in combination, a generator on each car, means for driving the generators, a plurality of train-line power conductors on each car, switching means for connecting the generator on each car to the power conductors on that car, means responsive to the generator voltage for controlling the operation of said switching means, a switch at each end of each car for connecting the train-line power conductors on a car to the conductors on one or the other of the adjacent cars, interlocking means on said switching means for controlling the operation of said switches, and cross-connected interlocking means on said switches for preventing both switches on a car from being closed at the same time.

7. In a train-line control system for a plurality of cars, in combination, a generator on each car, means for driving the generators, a plurality of train-line power conductors on each car, switching means for connecting the generator on each car to the power conductors on that car, means responsive to the generator voltage for controlling the operation of said switching means, a switch at each end of each car for connecting the train-line power conductors on a car to the conductors on one or the other of the adjacent cars, interlocking means on said switching means for controlling the operation of said switches, and cross-connected interlocking means on said switches for preventing both switches on a car from being closed at the same time thereby preventing one generator from supplying power to more than two cars at a time.

GEORGE R. PURIFOY.
ROBERT E. BURKHART.

REFERENCES CITED

The following references are of record in the file of this patent:

UNITED STATES PATENTS

| Number | Name | Date |
|---|---|---|
| 931,613 | Jackson | Aug. 17, 1909 |
| 1,528,045 | Butcher | Mar. 3, 1925 |
| 1,791,327 | Seeley | Feb. 3, 1931 |
| 2,459,631 | Earnes | Jan. 18, 1949 |